Jan. 23, 1940.　　　G. MARTEL　　　2,187,861
COTTON PLANTER
Filed April 21, 1938　　　3 Sheets-Sheet 1
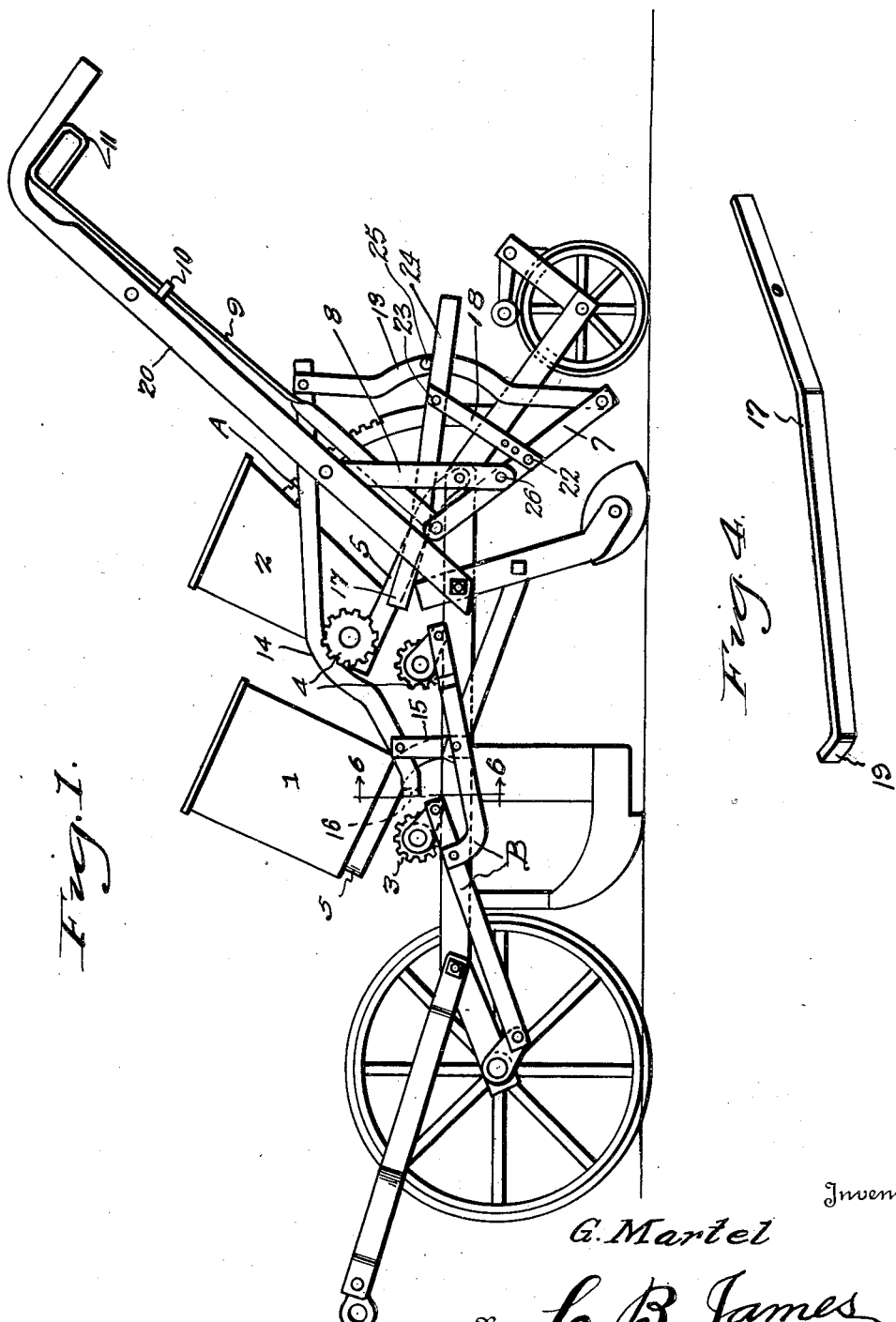
Inventor
G. Martel
By L. B. James
Attorney Jan. 23, 1940.  G. MARTEL  2,187,861
COTTON PLANTER
Filed April 21, 1938   3 Sheets-Sheet 2
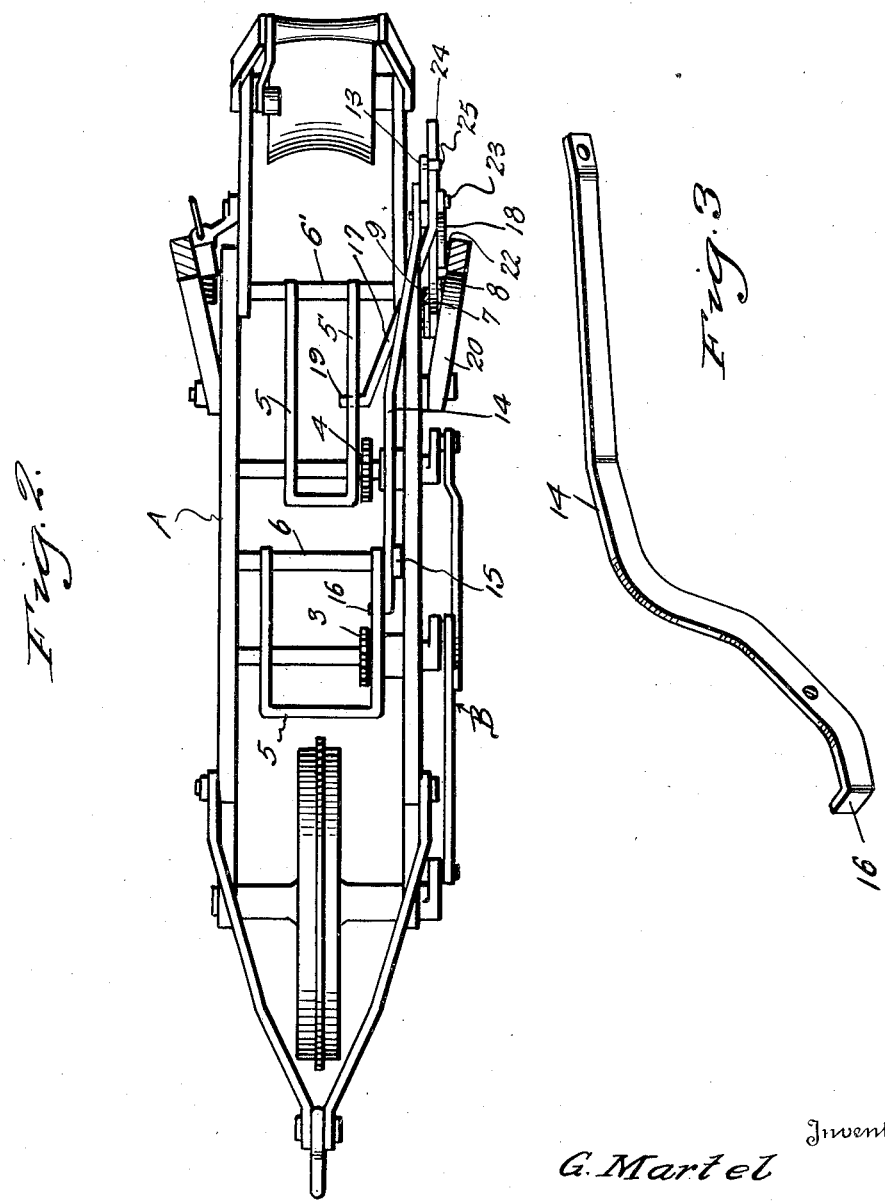
Inventor
G. Martel
By L. B. James
Attorney Jan. 23, 1940.                G. MARTEL                2,187,861
                             COTTON PLANTER
                         Filed April 21, 1938         3 Sheets-Sheet 3
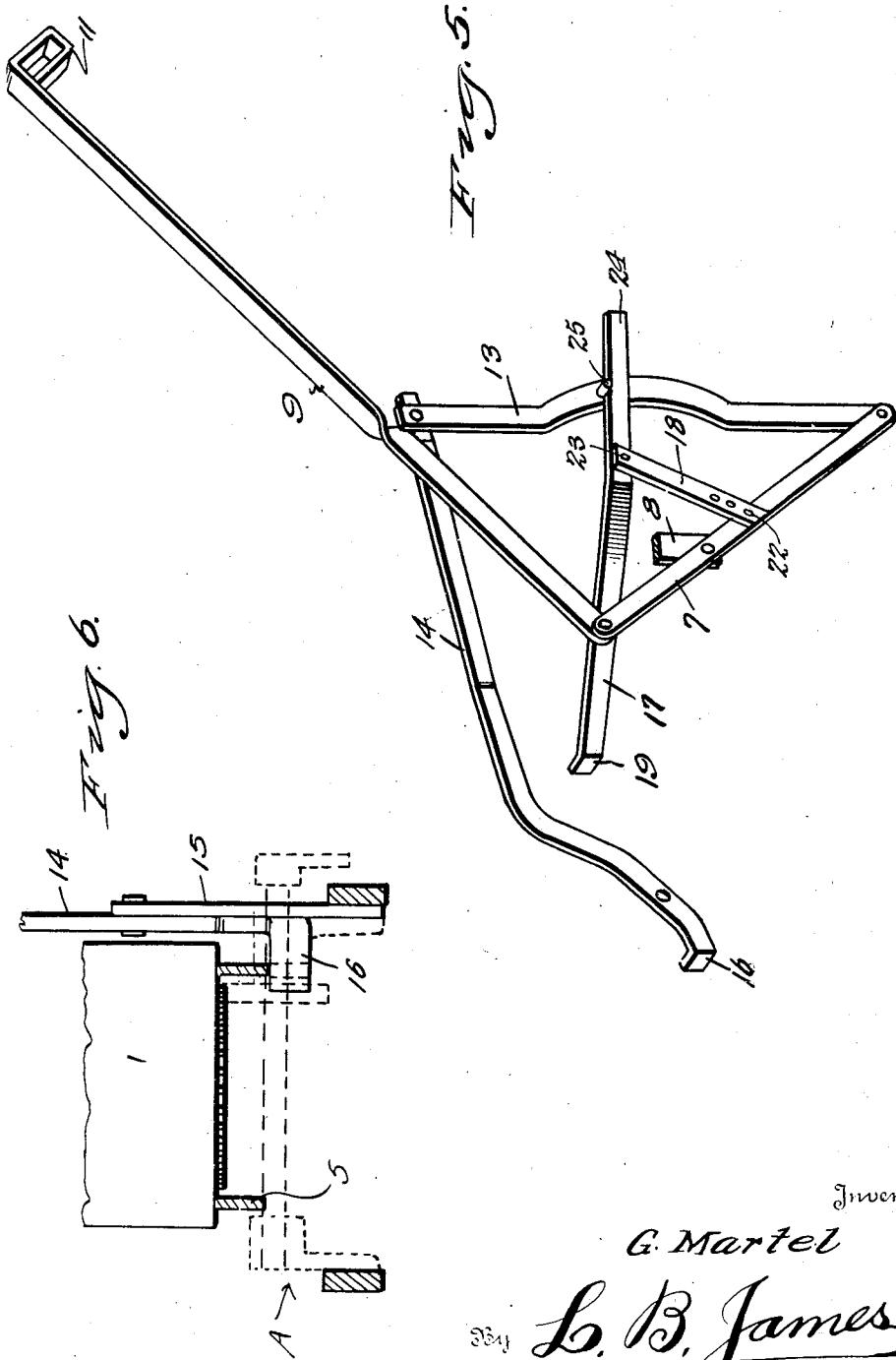
Inventor
G. Martel
By L. B. James
       Attorney Patented Jan. 23, 1940

2,187,861

UNITED STATES PATENT OFFICE 2,187,861

COTTON PLANTER

Gervis Martel, Eunice, La.

Application April 21, 1938, Serial No. 203,389

2 Claims. (Cl. 111—52)

This invention relates to improvements in planters, the general object of the invention being to provide means, actuated from a point adjacent the handle of the implement, for stopping the feeding means of the seed planter, when desired, and also the fertilizer feed means, when such means are on the implement.

Thus when turning at the end of a row or in transferring the implement from one field to another, the seeding means and the fertilizing means, can be thrown out of operation so as to stop the feeding action, thus preventing the waste of seed and of fertilizer.

The invention also consists in certain other features of construction, combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation showing the invention applied to one type of planter, with both the hoppers for the seed and fertilizer in non-distributing position.

Figure 2 is a top plan view of Fig. 1 with parts removed and parts in section.

Figure 3 is a view of the long lever for tilting the front hopper.

Figure 4 is a view of the lever for tilting the rear hopper.

Figure 5 is a perspective view of the tilting means for the two hoppers.

Figure 6 is a fragmentary detail taken on the line 6—6 of Figure 1 with the hopper in operative position, the actuating means being shown in dotted lines.

In these drawings, the letter A indicates a planter implement of any suitable type, which includes the front and rear hoppers 1 and 2 and the gearings 3 and 4 for actuating the feed means of the hoppers, these gearings being actuated from the front wheel of the implement such as by the cranks and connecting bars shown generally at B. In carrying out the invention, each hopper is mounted on a swinging frame, the frames for the front and rear hoppers being indicated at 5 and 5' respectively, the rear ends of which are connected to respective cross shafts 6 and 6' carried by the frame of the implement. Each hopper is provided with feeding means actuated by the gearing and the invention also embodies means for lifting each hopper supporting frame 5, 5' so as to raise the feeding means out of engagement with the gearing, as shown in Fig. 1.

Such means includes a lever 7, pivoted intermediate its ends to a hanger 8 attached to one of the handles 20 of the implement frame. The front end of the lever is pivoted to the lower end of a hand bar 9 which is supported for sliding movement on said handle 20 of the implement, as shown at 10. The upper end of the bar is formed with a hand engaging loop 11. The rear end of the lever 7 is pivoted to the lower end 21 of an upstanding link 13, the upper end of which is pivoted to the rear end of a lever 14, which is pivoted adjacent its front end to an upright 15 on the implement frame. The front end of the lever 14 is bent inwardly, as shown at 16 to come under the frame supporting the front hopper 1. A short lever 17 is connected to the lever 7 by a bar 18 and the front end of this lever 17 is bent as shown at 19 to come under the rear hopper 2. The bar 18 is fixed to the lever 7 at 22 and projects upward for attachment to the lever 17 at 23. The lever 17 projects rearwardly from the bar 18 as at 24 to cross the link 13 and a pin 25 is carried by said link 13 and rests on the rear portion 24 so that the several members 7, 17 and 18 rock about the pivot 26 together. Thus when the rear end 24 of the lever 17 is tilted downwardly the bent end 19 moves upwardly.

Thus by pulling upwardly on the hand bar 9 the levers 14 and 17 will be caused to swing the hoppers upwardly, and thus move their feeding means out of engagement with the gearing so that said feeding means will not be actuated and thus no material will feed from the hoppers.

As before stated this will save seed and fertilizer when the implement is being turned at the ends of rows or when being transferred from one field to another.

Of course when but one hopper is being used, the lever for that hopper which is not in place will serve no function and may be removed or not installed.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. In an implement including a frame, handles for said frame, a pair of tiltable hoppers, feeding means for the same and means for actuating the feeding means, a lever for moving each hopper to raised position to disengage the actuating means from the feeding means, a third lever pivoted intermediate its ends to a part of the implement frame, means for connecting the rear portion of the third lever to the two hopper actuating levers, a hand bar connected to the front end of the said third lever and means for slidably supporting the bar from a handle of the implement.

2. In a planter, an implement frame, handles mounted on said frame, a pair of seed hopper supporting frames pivotally supported at their rear ends on the implement frame and adapted to be tilted, seed hoppers supported on said frames and provided with feed means, gearings supported on said implement frame and operating the feed means upon the hopper frames being in downwardly tilted position, said feed means disengaging from the gearings upon the hopper frames being tilted upwardly, lever means supported on said frame and including elements engaging beneath the hopper frames for tilting the frames upwardly, and manually controlled operating means connected to said lever means.

GERVIS MARTEL.